United States Patent [19]
Lee et al.

[11] Patent Number: 5,798,432
[45] Date of Patent: Aug. 25, 1998

[54] METHOD OF MAKING THERMOTROPIC LIQUID CRYSTALLINE POLYMERS CONTAINING HYDROQUINONE

[75] Inventors: Cherylyn Lee, Fanwood; Vincent J. Provino, Clifton; H. Clay Linstid, III, Clinton, all of N.J.

[73] Assignee: Hoechst Celanese Corp., Somerville, N.J.

[21] Appl. No.: 620,780

[22] Filed: Mar. 22, 1996

[51] Int. Cl.⁶ .......................... C08G 69/44; C08G 73/00
[52] U.S. Cl. .......................... 528/176; 528/179; 528/190; 528/191; 528/193; 528/194; 528/211; 528/219; 528/271; 528/310; 528/322; 528/332; 528/335; 528/336; 528/348; 524/601; 524/602; 524/604; 524/607
[58] Field of Search .......................... 528/319, 322, 528/332, 176, 336, 179, 190, 191, 193, 194, 271, 272, 211, 219, 348, 335; 524/601, 602, 604, 607

[56] References Cited

U.S. PATENT DOCUMENTS

| | | |
|---|---|---|
| 3,637,595 | 1/1972 | Cottis et al. . |
| 4,011,199 | 3/1977 | McFarlane et al. . |
| 4,083,829 | 4/1978 | Calundann et al. . |
| 4,169,933 | 10/1979 | Jackson, Jr. et al. . |
| 4,181,792 | 1/1980 | Jackson, Jr. et al. . |
| 4,355,132 | 10/1982 | East et al. . |
| 4,370,466 | 1/1983 | Siemionko . |
| 4,487,916 | 12/1984 | Irwin . |
| 4,522,974 | 6/1985 | Calundann et al. . |
| 4,851,497 | 7/1989 | Wakui et al. . |
| 4,900,804 | 2/1990 | Wakui et al. . |
| 4,937,310 | 6/1990 | Hayashi et al. . |
| 5,025,082 | 6/1991 | Kishiro et al. . |
| 5,110,896 | 5/1992 | Waggoner et al. . |

FOREIGN PATENT DOCUMENTS

WO 95/33803  12/1995  WIPO .

*Primary Examiner*—P. Hampton-Hightower

[57] ABSTRACT

Liquid crystalline polymers that are made from 4-hydroxybenzoic acid, 2,6-naphthalenedicarboxylic acid, terephthalic acid, hydroquinone, and N-acetyl-4-aminophenol by heating the monomers in the presence of acetic anhydride are more easily synthesized in high molecular weight if isophthalic acid is also included as a monomer at a level of about 0.5 mole % to about 10 mole %.

28 Claims, No Drawings

METHOD OF MAKING THERMOTROPIC LIQUID CRYSTALLINE POLYMERS CONTAINING HYDROQUINONE

FIELD OF THE INVENTION

This invention relates generally to thermotropic liquid crystalline polymers and more specifically to thermotropic liquid crystalline polymers that contain monomer units derived from hydroquinone and isophthalic acid.

BACKGROUND OF THE INVENTION

Thermotropic liquid crystalline polymers are well-known in the art. They have excellent properties that make them useful in the manufacture of high strength fibers, molded parts, and other shaped articles because of their thermal stability, chemical resistance and melt viscosity profile.

Hydroquinone is an ideal monomer for use in liquid crystalline polymers because of its geometry, which makes it suitable as a monomer unit in the stiff, linear aromatic chain of a polymer that contains polyester units. Hydroquinone is also relatively inexpensive compared with many of the other monomers that are used in the manufacture of thermotropic liquid crystalline polymers. The use of hydroquinone in the synthesis of liquid crystalline polymers presents a problem under conditions where hydroquinone diacetate can form because of its volatility. Hydroquinone diacetate can evaporate from the polymerization reaction, and the loss of even a small amount of the monomer can shift the stoichiometry of the reaction and lower the molecular weight of the polymer significantly. This problem has been recognized elsewhere; the usual solution to this problem has been to use excess hydroquinone to compensate for the hydroquinone that evaporates from the reactor (see for example U.S. Pat. Nos. 4,370,466 and 4,487,916).

Isophthalic acid has also been used as a monomer in numerous thermotropic liquid crystalline polymers, some of which also include hydroquinone. Examples include the well known polymer of hydroquinone, isophthalic acid, and 4-hydroxybenzoic acid; the polymer of 6-hydroxy-2-naphthoic acid, 4-hydroxybenzoic acid, isophthalic acid, terephthalic acid, and hydroquinone (U.S. Pat. No. 4,522,974); the polymer of 4-hydroxybenzoic acid, 2,6-naphthalenedicarboxylic acid, N-acetyl-4-aminophenol, hydroquinone, and isophthalic acid (U.S. Pat. No. 4,355,132); the polymer of 4-hydroxybenzoic acid, 2,6-naphthalenedicarboxylic acid, hydroquinone, and isophthalic acid (U.S. Pat. No. 4,083,829); the polymer of 2,6-napthalenedicarboxylic acid, terephthalic acid, isophthalic acid, and hydroquinone (U.S. Pat. No. 4,181,792); and the polymer of 4-hydroxybenzoic acid, isophthalic acid, terephthalic acid, and hydroquinone (U.S. Pat. No. 3,637,595). It does not appear that it has been recognized heretofore that polymers containing a small amount of isophthalic acid as a comonomer with hydroquinone are easier to synthesize in high molecular weight than the corresponding polymers without isophthalic acid.

SUMMARY OF THE INVENTION

Thermotropic liquid crystalline polymers that contain monomer units derived from hydroquinone can be made much more easily in high molecular weight if isophthalic acid is also included as a monomer in the melt polymerization. Thus, when thermotropic liquid crystalline polymers are made by the condensation of 4-hydroxybenzoic acid, hydroquinone, optional other aromatic diols, and one or more aromatic diacids in the presence of acetic anhydride at a temperature high enough to induce polymerization, the polymer can readily be made in high molecular weight if about 0.5 mole % to about 10 mole % of isophthalic acid is included as a comonomer when using a stoichiometric ratio of reactants. "Stoichiometric ratio" means that the number of hydroxyl groups and the number of carboxyl groups in the monomers that are fed into the polymerization reaction are essentially the same, so that the complete reaction of the monomers yields a high molecular weight polymer. Addition of excess hydroquinone is not necessary to compensate for loss of hydroquinone through evaporation of hydroquinone diacetate, and a high molecular weight is achieved without excess hydroquinone. The aromatic diacids which are used in this improved polymerization process along with isophthalic acid to make a high molecular weight polymer include 2,6-naphthalenedicarboxylic acid, terephthalic acid, 4,4'-biphenyldicarboxylic acid and mixtures thereof. The aromatic diols that may be used as comonomers include 2,6-dihydroxynapthalene, 4,4'-biphenol, and mixtures thereof.

The improvement of including isophthalic acid as a comonomer at a level of about 0.5 mole % to about 10 mole % also makes it easier to synthesize thermotropic liquid crystalline poly(esteramides) having a high molecular weight by condensation of the monomers in the presence of acetic anhydride at elevated temperatures, where the monomers are 4-hydroxybenzoic acid, hydroquinone, optional other aromatic diols, as described above, one or more aromatic diacids as described above, and one or more aromatic amines selected from the group consisting of 4-aminophenol, 1,4-phenylene diamine, 4-aminobenzoic acid, N-alkyl derivatives of these compounds, where the alkyl group is methyl, ethyl, n-propyl, n-butyl, or a mixture of these alkyl groups, and the N-acyl derivatives of any of the above aromatic amine monomers.

The process improvement is particularly useful in making a thermotropic liquid crystalline poly(esteramide) by combining monomers I, II, III, IV, V, VI, and optional VII and heating and stirring the monomers in the presence of acetic anhydride under conditions that will cause the monomers to condense to a polymer having an intrinsic viscosity of at least about 2 dl/g, and preferably at least about 3 dl/g, as measured at 25° C. as a 0.1% solution on a weight/volume basis in a mixture of equal volumes of pentafluorophenol and hexafluoroisopropanol. The structures of the monomers follow:

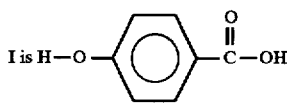

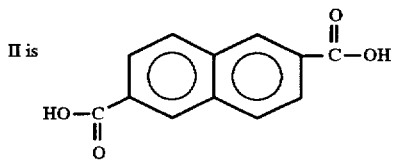

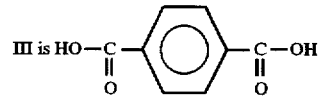

IV is 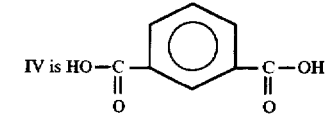

V is 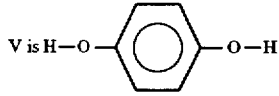

VI is 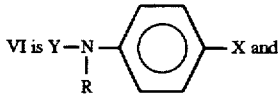

VII is 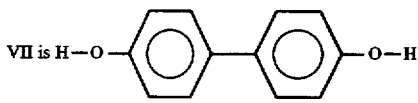

In monomer VI, X is selected from the group consisting of NY'R',C(=O)OH, OH and mixtures thereof. Y and Y' are independently selected from H,C(=O)CH₃, and mixtures thereof. R and R' are alike or different and are independently selected from H, alkyl groups having 1 to 4 carbon atoms, fluoroalkyl groups having 1 to 4 carbon atoms, phenyl, and mixtures thereof. The concentrations of monomers I–VII on a mole basis are about 20% to about 70% of I, about 5% to about 35% of II, about 2% to about 20% of III, about 0.5% to about 10% of IV, about 5% to about 35% of V, about 2% to about 25% of monomer VI, and 0 to about 15% of monomer VII. The monomers are combined in essentially a stoichiometric ratio, so that a high molecular weight polymer is produced.

The polymer that results from the condensation of monomers I, II, III, IV, V, VI, and VII is also new, and comprises the residues of these monomers (I', II', III', IV', V', VI', and VII', illustrated below):

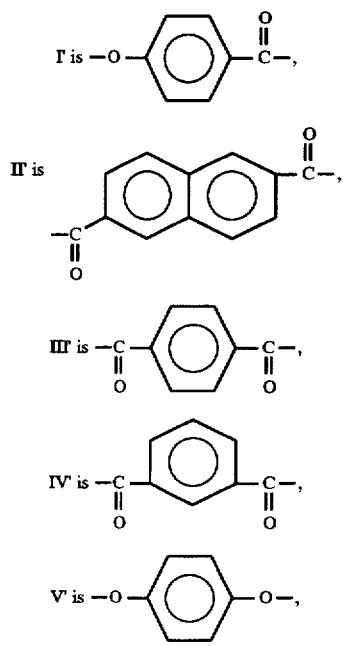

VI' is , and

VII' is 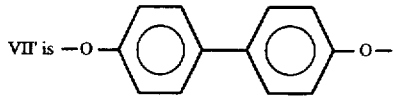

X' in monomer unit VI' can be NR', C=O, O, or a mixture of these. R and R' are alike or different and are independently selected from H, alkyl groups having 1 to 4 carbon atoms, fluoroalkyl groups having 1 to 4 carbon atoms, phenyl, and mixtures thereof.

The liquid crystalline poly(esteramide) on a mole basis consists essentially of about 20% to about 70% of monomer repeat unit I', about 5% to about 35% of monomer repeat unit II', about 2% to about 20% of monomer repeat unit III', about 0.5% to about 10% of monomer repeat unit IV', about 5% to about 35% of monomer repeat unit V', about 2% to about 25% of monomer repeat unit VI', and 0 to about 15% of monomer repeat unit VII'.

DETAILED DESCRIPTION OF THE INVENTION

Polymerization reactions in which hydroquinone is a monomer and in which the reactants (including isophthalic acid) are present in a stoichiometric ratio result in high molecular weight liquid crystalline polymers more easily and more reproducibly when isophthalic acid is also included in the polymerization reaction as comonomer. If isophthalic acid is not present, the synthesis of the corresponding polymer, after the amounts of aromatic diacids or aromatic diols are adjusted to compensate for the absence of isophthalic acid, often results in a low molecular weight polymer or no polymer at all. High molecular weight polymers can be obtained without isophthalic acid, but high molecular weight is obtained with less reproducibility or by methods that raise the cost of the polymer on a commercial scale compared with methods using isophthalic acid.

For example, a polymer having a usable molecular weight is sometimes achieved by heating the polymerization reaction using stoichiometric ratios of reactants for an extended time and/or at high temperature under vacuum (e.g. heating at 360° C. for more than 1 hour) for the preferred poly (esteramide). This method often results in a polymer, but the molecular weight varies significantly from batch to batch, especially at high levels of hydroquinone. Another method that is used to obtain high molecular weight polymer is to use excess hydroquinone in the polymerization reactions (e.g. about 5–10% more than the stoichiometric amount). (See for example U.S. Pat. Nos. 4,370,466 and 4,487,916). This alleviates the molecular weight problem, but is not practical on a commercial scale, since the excess hydroquinone must be recovered and recycled. The use of a large excess of acetic anhydride (e.g. an excess of more than about 20%) also sometimes improves the molecular weight, but again is not commercially practical.

The mechanism by which the presence of isophthalic acid yields a polymer of suitable molecular weight or in less time using a stoichiometric ratio of reactants is not known, and the scope of the invention should not be construed as depending on any particular mechanism.

The use of isophthalic acid in the synthesis of liquid crystalline polymers based on hydroquinone is most advantageous in melt acidolysis polymerization reactions in which the non-acetylated monomers are mixed in the presence of acetic anhydride and heated with mixing to a high enough temperature to induce polymerization. Acetic acid is produced as a by-product. The temperature by the end of the reaction is normally about 280° to about 380° C., with the polymer being obtained in a molten state. The polymerization reaction is typically completed by heating the molten polymer under vacuum at an elevated temperature, resulting in removal of residual acetic acid and an increase in molecular weight. Normally the amount of acetic anhydride that is used is the amount that would be required to acetylate all of the hydroxyl groups and any free (i.e. non-acetylated) amine groups when aromatic amines are also used as monomers. A very slight excess (typically about 2–3%) of acetic anhydride is often used, but a larger excess is not required. When poly(esteramides) are synthesized, acetylated amines may be used as monomers with the free phenols. In particular, 4-aminophenol is unstable, and it is normally used in polymerization reactions as N-acetyl-4-aminophenol. In the presence of isophthalic acid, the polymerization reactions proceed reproducibly to a high molecular weight. The amount of isophthalic acid that is used is in the range of about 0.5 mole % to about 10 mole %, preferably in the range of about 1 mole % to about 5 mole %, expressed as a mole % of all the monomers.

Isophthalic acid may also be advantageously used in other kinds of melt polymerization reactions leading to thermotropic liquid crystalline polymers. For example, the hydroxyl groups of the monomers in the melt polymerization can be acetylated in a prior step, in which case the melt polymerization reaction involves the reaction of acetylated phenols, such as hydroquinone diacetate, 4-acetoxybenzoic acid, and the like, with aromatic acids and diacids. Otherwise, the reaction is similar to the reaction of non-acetylated monomers in the presence of acetic anhydride.

A preferred combination of monomers that may be advantageously polymerized to high molecular weight with isophthalic acid comprises 4-hydroxybenzoic acid, 2,6-naphthalenedicarboxylic acid, and hydroquinone. Preferably terephthalic acid, 4,4'-biphenol, or both are also included with these monomers in the polymerization process. The polymerization of both 4,4'-biphenol and terephthalic acid, along with 4-hydroxybenzoic acid, 2,6-naphthalenedicarboxylic acid, hydroquinone, and about 0.5% to about 10% isophthalic acid is a particularly preferred embodiment.

When this process is used to make poly(esteramides), the amide-forming aromatic monomer can be one or more of the following: 4-aminophenol, 4-aminobenzoic acid, 1,4-phenylenediamine, N-methyl derivatives of these monomers, or N-acetyl derivatives of any of these monomers, including the N-methyl monomers. Preferred poly(esteramides) are made by polymerization of 4-hydroxybenzoic acid, 2,6-naphthalenedicarboxylic acid, hydroquinone, and one or more of the amide-forming monomers listed above, along with isophthalic acid. Preferably, the polymerization reaction also includes 4,4'-biphenol, terephthalic acid or both. Terephthalic acid is a particularly preferred monomer. Therefore, the polymerization of 4-hydroxybenzoic acid, 2,6-naphthalenedicarboxylic acid, terephthalic acid, hydroquinone, an amine containing monomer (e.g. 4-aminophenol, usually charged as N-acetyl-4-aminophenol), and about 0.5% to about 10% of isophthalic acid is an especially preferred polymerization reaction using this improved process.

This process is particularly useful for making a high molecular weight poly(esteramide) from 4-hydroxybenzoic acid (monomer I), 2,6-naphthalenedicarboxylic acid (II), terephthalic acid (III), isophthalic acid (IV), hydroquinone (V), aromatic amine monomers having the structure VI, as described in the summary of the invention section, and optional 4,4'-biphenol.

In preferred embodiments, the monomers are charged at the following levels, on a mole % basis: monomer I, about 20% to about 65%; II, about 10% to about 30%; III, about 2% to about 15%; IV, about 1% to about 5%; V, about 10% to about 30%; VI, about 3% to about 20%; VII, 0 to about 10%. In highly preferred embodiments the monomers are charged as follows on a mole % basis: I, about 40% to about 65%; II, about 10% to about 20%; III, about 2% to about 15%; IV, about 1% to about 5%; V, about 10% to about 20%; VI, about 3% to about 15%; monomer VII is not present. In the most preferred embodiment, the monomers are charged as follows on a mole % basis: I, about 60%; II, about 12.5%; III, about 5%; IV, about 2.5%; V, about 15%; VI, about 5 %.

In these embodiments, monomer VI is preferably 4-aminophenol, which is charged to the reactor as N-acetyl-4-aminophenol. In all embodiments, 4,4'-biphenol is optional and can be omitted. The monomers are polymerized by a melt acidolysis polymerization process, in which non-acetylated monomers are heated in the presence of acetic anhydride. Alternatively, the monomers can be acetylated in a first step, and the acetylated monomers can then be polymerized by a melt acidolysis process in the molten state in a second step. Reaction of monomers in the presence of acetic anhydride is preferred.

In either case, the monomers are heated with stirring to a sufficiently high temperature that the acetylated phenol or amine groups react with the carboxylic acid groups to form amide or ester linkages, with the formation of by-product acetic acid. The heating and stirring are continued for a long enough time and at a high enough temperature that a polymer forms that has an inherent viscosity (I.V.) of at least about 2 dl/g, preferably at least about 3 dl/g, and most preferably at least about 5 dl/g, with the I.V. being measured at 25° C. as a 0.1% solution (wt/vol) of polymer in a mixture of equal volumes of pentafluorophenol and hexafluoroisopropanol. Typically, the polymerization is completed at a temperature high enough that the polymer is in the molten state at a temperature in the range of about 280° C. to about 380°, preferably in the range of about 320° to about 380° C. The polymer is normally heated under vacuum in the molten state for up to about one hour, with the time being dependent on such variables as the temperature, the vacuum, and the stirring speed.

The product of this polymerization reaction is also novel, comprising monomer units that are the residues of 4-hydroxybenzoic acid (I'), 2,6-naphthalenedicarboxylic acid (II'), terephthalic acid (III'), isophthalic acid (IV'), hydroquinone (V'), an amide-forming monomer (VI') (illustrated in the Summary of the Invention section), and optional 4,4'-biphenol (VII'). The polymer is generally made by the melt acidolysis polymerization process described above. It may also be made by other polymerization routes involving reactive derivatives of the monomers, although these other polymerization routes are less preferred. One example is interfacial polymerization, in which the acid chloride derivatives of the carboxylic acid monomers are reacted with the free phenols and amines. An alternative process involves the reaction of the phenyl esters of the carboxylic acids (e.g. diphenyl terephthalate) with the free amines and phenols, with formation of by-product phenol, which is removed by distillation. The amounts of monomer units are equivalent to the amounts of the corresponding monomers set forth above.

The liquid crystalline polymers of this invention are useful in the manufacture of shaped articles, such as fibers, films, (eg. extruded sheets or film, and molded articles. They are particularly useful in making shaped articles in which a high heat distortion temperature is required. In copending U.S. application Ser. Nos. 08/545,547 and 08/545,076, it was discovered that these same polymers without isophthalic acid monomer units (i.e., polymers containing monomer units I', II', III', V', VI' and optional VII') have exceptionally high heat distortion temperatures (HDT's), measured at 264 psi by ASTM Method D648, in comparison with their crystalline melting temperatures (Tm) as measured by differential scanning calorimetry. A small difference between Tm and HDT is desirable because it is possible to make a shaped article that resists thermal deformation because of a high HDT without decomposition because a lower melt temperature is needed to shape the polymer. This can be seen by comparing the difference between Tm and HDT for 30% glass-filled compositions with the same difference for other glass-filled liquid crystalline polymers with similar compositions. Tm—HDT is generally less than about 45° C. for the polymers that contain monomer units I', II', III', V', VI' and optional VII', and do not contain isophthalate monomer units. Similar polymers that contain isophthalate but not terephthalate monomer units have a much larger spread between Tm and HDT (generally greater than about 70° C.).

The polymers of this invention that contain both isophthalate and terephthalate monomer units are in general easier to manufacture, but still have a high HDT compared with melting point, especially in the preferred embodiments (e.g. the range is 40°–69° for the polymers in Examples 1–5, and 40° and 42° for preferred Examples 4 and 5). Thus a monomer composition can be chosen according to the desired HDT and melting temperature, and will be easy to manufacture because it also includes isophthalic acid in the synthesis. 4,4'-Biphenol is an optional monomer for use in this invention because it can be used to lower the melting temperature of the polymer when desired while retaining a relatively high HDT compared with the melting temperature.

In making compositions for injection molding, the polymers of this invention are generally blended with fillers and other additives at levels up to about 70% by weight in order to achieve optimum properties. Fillers and additives that may be useful include one or more fillers or reinforcing agents selected from the following list, which is not a complete or exhaustive list: glass fiber, calcium silicate, silica, clays, talc, mica, polytetrafluouroethylene, graphite, alumina, sodium aluminum carbonate, barium ferrite, wollastonite, carbon fiber, polymeric fiber, aluminum silicate fiber, titanium fiber, rock wool fiber, steel fiber, tungsten fiber and wollastonite fiber. Other kinds of additives that may be used in addition to reinforcing fillers and reinforcing fibers include oxidation stabilizers, heat stabilizers, light stabilizers, lubricants, mold release agents, dyes, pigments, and plasticizers.

This invention is further illustrated by the following non-limiting examples.

EXAMPLES

A number of polymers were made in accordance with the invention described herein. These polymers are described below as Examples 1–5. The method of making the composition of Example 1 is set forth below. The polymers of Examples 2–5 were made by similar methods, except for adjustments in the amounts of the monomers. The monomer compositions of Examples 1–5, along with physical properties, are presented in Table 1. Properties of glass-filled molded test specimens are presented in Table 2, and fiber properties are presented in Table 3.

A series of comparative examples are also included in the tables. These illustrate similar polymers made without the use of isophthalic acid as a comonomer. These were made by the same basic method as was used to make the polymers that contain isophthalic acid. Examples C-1 to C-4 were made using the stoichiometric amount of hydroquinone that is required to make a polymer. Examples C-5 to C-8 were made using an excess of hydroquinone to compensate for loss of the volatile hydroquinone from the reactor during polymerization. Typical procedures for making polymers by these methods are also provided below.

In the Examples and Tables, the amounts of monomers in the polymers are in mole % unless otherwise stated. The following abbreviations are used:

HBA, 4-hydroxybenzoic acid; NDA, 2,6-naphthalenedicarboxylic acid; TA, terephthalic acid; IA, isophthalic acid; HQ, hydroquinone; APAP, N-acetyl-4-aminophenol; BP, 4,4'-biphenol; IV, inherent viscosity, measured at 25° as a 0.1 % solution on a weight/volume basis in a mixture of equal volumes of pentafluorophenol and hexafluoroisopropanol.

Typical Procedure for Polymers with IA

A polymer composed of monomer units derived from 40 mole % HBA, 20 mole % NDA, 5 mole % TA, 5 mole % IA, 25 mole % HQ, and 5 mole % APAP, corresponding to the composition in Example 1, was synthesized by the following method.

In a three neck 4-liter glass reactor immersed in a sand bath and equipped with a nitrogen inlet, thermocouple, vigreux column attached to a condenser and receiver, and C-shaped 316 stainless steel mechanical stirrer were placed the following monomers:

(a) 552 grams of HBA
(b) 432 grams of NDA
(c) 83 grams of TA
(d) 83 grams of IA
(e) 275 grams of HQ
(f) 75.5 grams of APAP and 0.2 grams of potassium acetate. The reactor was thoroughly purged of oxygen by evacuation and then filling and flushing with nitrogen (30 to 40 cc/min) three times. Acetic anhydride (1002.1 grams, 2.5 mole % excess, 99.3% purity) was added to the reactor. The flask was immersed in a sand bath which was equipped with a MicRIcon® controller to accurately control the temperature in stages. The mixture was heated in the sand bath according to the following stages and rates:

| Stage | Heating From (°C.) | Heating To (°C.) | Time (min) |
|---|---|---|---|
| 1 | 25 | 25 | 1 |
| 2 | 25 | 125 | 50 |
| 3 | 125 | 140 | 40 |
| 4 | 140 | 150 | 20 |
| 5 | 150 | 200 | 45 |
| 6 | 200 | 210 | 5 |
| 7 | 210 | 220 | 6 |
| 8 | 220 | 275 | 50 |
| 9 | 275 | 310 | 70 |
| 10 | 310 | 350 | 50 |
| 11 | 350 | 350 | 15–30 |
| 12 | hold at 35° C. until complete | | |

The contents of the flask were heated while stirring at 75 rpm. The acetic acid began distilling off when the mixture reached about 140° C. A total of 1155 ml of acetic acid was collected. After reaching 350° C., the polymer was held at 350° for about 15 to 30 minutes (stage 11). The flask was then evacuated to a pressure of less than 1.0 mm Hg while stirring was continued at 350° C. (stage 12 above). The melt viscosity increased while the remaining acetic acid was removed. The polymer was stirred until the torque on the stirrer had reached the desired level measured as voltage (15–25mV). In this example, the torque increased by 25 mV during the time that vacuum was applied. The polymerization was then stopped and the polymer was cooled.

The resulting polymer had an inherent viscosity (IV) of 4.4 dl/g. The melt viscosity measured at 350° C. was 748 poise at 1000 s$^{-1}$. The melt endotherm peak ($T_m$) was measured as 295° C. by differential scanning calorimetry (DSC).

Typical Procedure for Polymers Made Using Stoichiometric Hydroquinone

A polymer composed of monomer units derived from 40 mole % HBA, 20 mole % NDA, 10 mole % TA, 25 mole % HQ, and 5 mole % APAP, corresponding to the composition in Comparative Example C-1, was synthesized by the same process described earlier for polymers that contain IA, except for the monomers. Monomers were combined in the apparatus used in the previous examples as follows:

(a) 662.4 grams of HBA
(b) 518.4 grams of NDA
(c) 199.2 grams of TA
(d) 330.0 grams of HQ
(e) 90.6 grams of APAP Potassium acetate catalyst (0.24 grams) and acetic anhydride (1202.5 grams; 2.5 mole % excess, 99.2% purity) were charged. The mixture was heated using the program described in the previous example. The reaction was held at 350° C. under a vacuum of 1 mm Hg for 54 min. There was no significant torque increase during the vacuum stage, and the experiment was discontinued. The desired polymer had thus not been made in useful molecular weight when the reaction was stopped. This method with the same monomer composition in one experiment gave a polymer with an IV of 3.7 dl/g when the molten material was heated to 360° C. under vacuum for 1–2 hours. Lower molecular weight is more typically achieved.

Typical Procedure for Polymers Made Using Excess Hydroquinone

A polymer composed of monomer units derived from 40 mole % HBA, 20 mole % NDA, 10 mole % TA, 25 mole % HQ, and 5 mole % APAP, corresponding to the composition in Comparative Example C-5, was synthesized according to the procedure described for polymers that were made using IA, except for the materials. Monomers were combined in the apparatus used in the previous examples as follows:

(a) 552.0 grams of HBA
(b) 432.0 grams of NDA
(c) 166.0 grams of TA
(d) 302.5 grams of HQ
(e) 75.7 grams of APAP The amount of hydroquinone is 10% greater than the stoichiometric amount. Potassium acetate catalyst (0.2 grams) and 1052.7 grams of acetic anhydride (2.5 mole % excess) were charged. The mixture was heated using the program described in the previous example. The reaction was held at 350° C. under a vacuum of 1 mm Hg until it was completed as judged by the increase in torque voltage (25 mV). The poly(esteramide) had an IV of 7.0 dl/g, and the $T_m$ by DSC was 318° C.

Comparative Examples C-9 and C-10

For comparison, two polymer samples were made that included isophthalic acid as a monomer but not terephthalic acid. The polymers were made by melt acidolysis polymerization as in Example 1, except that the final stage of the polymerization and the heating under vacuum were carried out at 360° C. for a period of about 1–2 hours.

In Example C-9, the polymer was made from 50% I, 15% II, 10% IV, 20% V, and 5% of N-acetyl-4-aminophenol (VI), all on a mole basis. The polymer had an inherent viscosity of 2.2, Tm of 269°, and an HDT of 193° when filled with 30% glass fiber. The value of Tm-HDT is 76° C., compared with a value of Tm-HDT of 62° for a similar composition in Example 3.

In Example C-10, the polymer was made from 60% I, 15% II, 5% IV, 15% V, and 5% N-acetyl-4-aminophenol on a mole basis. The polymer had an inherent viscosity of 3.6 dl/g, a Tm of 304°, and an HDT of 234°. The value of Tm-HDT is 70°, compared with value of Tm-HDT of 40° C. and 42° C. for the polymers of Examples 4 and 5, which have the same monomer composition except for the substitution of 2.5 mole % of 2,6-naphthalenedicarboxylic acid or 2.5 mole % of terephthalic acid for 2.5 mole % of isophthalic acid.

Example 6

Polymers disclosed herein can be made with a high degree of reproducibility on a larger scale. For example, 4 batches of polymer were made in a 50 gallon reactor by the following procedure. In a 50 gallon hastelloy steel reactor under a nitrogen purge are placed: (a) 131.3 lbs of 4-hydroxybenzoic acid (HBA), (b) 42.8 lbs of 2,6-naphthalenedicarboxylic acid (NDA), (c) 13.2 lbs of terephthalic acid (TA), (d) 6.6 lbs of isophthalic acid (IA), (e) 26.1 lbs of hydroquinone (HQ), (f) 12.0 lbs of N-acetyl-4-aminophenol (APAP), (g) 13.6 g of potassium acetate, and (h) 156.2 lbs of acetic anhydride (99.8% purity). The molar composition is: HBA, 60%; NDA, 12.5%; TA, 5%; IA 2.5%; HQ, 15%; APAP, 5%. The reactor is heated in stages using a MicRIon® controller. The temperature at each stage is increased to the final temperature of that stage during the elapsed time. The temperature at the start of each stage is the final temperature of the previous stage. Stages 12 and 13 are isothermal. The program follows:

| Heating Stage No. | Temperature (C.) | Elapsed Time (min) |
| --- | --- | --- |
| 1 | 25 | 1 |
| 2 | 125 | 50 |
| 3 | 140 | 40 |
| 4 | 150 | 20 |
| 5 | 200 | 45 |
| 6 | 210 | 5 |
| 7 | 220 | 6 |
| 8 | 275 | 50 |
| 9 | 310 | 70 |
| 10 | 330 | 25 |
| 11 | 350 | 25 |
| 12 | 350 | 20 |
| 13 | 350 | |

The reaction is carried out under nitrogen at atmospheric pressure through stage 12. The acetic acid begins distilling off when the reactor is at about 150° C. About 99% of the theoretical amount (156 lbs) is evolved by the end of segment 12. At this point the nitrogen purge is removed and the reactor is evacuated down to 3 mm Hg. The reaction is terminated when the torque reading reaches 1200 in-lb above its initial value. The reaction is terminated by replacing the vacuum with nitrogen and then extruding the molten polymer out of the reactor through a 5 hole die and through a pelletizer. The four batches of polymer have the following characterisitics:

| Yield (lbs) | Tm (°C.) | MV @ 1000 sec$^{-1}$ and 340° C. | IV (dl/g) |
|---|---|---|---|
| 158 | 318 | 511 | 5.2 |
| 168 | 319 | 447 | 5.2 |
| 170 | 318 | 519 | 5.2 |
| 169 | 319 | 487 | 5.2 |

It is to be understood that the above described embodiments of the invention are illustrative only and that modification throughout may occur to one skilled in the art. Accordingly, this invention is not to be regarded as limited to the embodiments disclosed herein.

TABLE 1

POLYMER COMPOSITIONS AND PROPERTIES

| Example | Composition[1] (mole %) | | | | | | delta torque (mV) | vac[4] time (min) | Tm (°C.) | IV (dl/g) | MV[5] at 1000 sec$^{-1}$ (poise) |
|---|---|---|---|---|---|---|---|---|---|---|---|
| | HBA | NDA | TA | IA | HQ | APAP | | | | | |
| 1 | 40 | 20 | 5 | 5 | 25 | 5 | 25 | 14 | 295 | 4.4 | 748 |
| 2 | 50 | 12.5 | 10 | 2.5 | 20 | 5 | 15 | 73 | 323 | 4.5 | 507 |
| 3 | 50 | 15 | 5 | 5 | 17.5 | 7.5 | 25 | 8 | 290 | 4.3 | 444 |
| 4 | 60 | 12.5 | 5 | 2.5 | 15 | 5 | 20 | 27 | 315 | | 419 |
| 5 | 60 | 15 | 2.5 | 2.5 | 15 | 5 | 20 | 30 | 315 | 5.4 | 520 |
| No IA - Stoichiometric HQ[2] | | | | | | | | | | | |
| C-1 | 40 | 20 | 10 | 0 | 25 | 5 | 1 | 54 | ND[8] | ND[8] | ND[8] |
| C-2 | 50 | 15 | 10 | 0 | 20 | 5 | 4 | 50 | ND[8] | ND[8] | ND[8] |
| C-3 | 50 | 15 | 10 | 0 | 17.5 | 7.5 | 20 | 52 | 322 | 5.5 | 836[6] |
| C-4 | 60 | 15 | 5 | 0 | 15 | 5 | 20 | 54 | 321 | 5.1 | 388[7] |
| No IA - Excess HQ[3] | | | | | | | | | | | |
| C-5 | 40 | 20 | 10 | 0 | 25 | 5 | 25 | 72 | 318 | 7.0 | 678 |
| C-6 | 50 | 15 | 10 | 0 | 20 | 5 | 25 | 12 | 327 | 6.9 | 630 |
| C-7 | 50 | 15 | 10 | 0 | 17.5 | 7.5 | 40 | 15 | 333 | 7.1 | 956[6] |
| C-8 | 60 | 15 | 5 | 0 | 15 | 5 | 25 | 29 | 325 | 6.0 | 856 |

[1]HBA is 4-hydroxybenzoic acid, NDA is 2,6-naphthalenedicarboxylic acid, TA is terephthalic acid, IA is isophthalic acid, HQ is hydroquinone, APAP is N-acetyl-p-aminophenol. Amounts are the mole % of residue of each of these monomers in the polymer.
[2]In Examples C-1 to C-4, stoichiometric HQ was charged. In Examples C-1 and C-2, no polymer was achieved after the listed time under vacuum. In Examples C-3 and C-4, polymer having a useful molecular weight was achieved, but the time under vacuum was longer than in the Examples using IA.
[3]In Examples C-5, C-6, and C-7, 10 wt % excess HQ was charged to the polymerization reactor. In Example C-8, 5 wt % excess HQ was charged. Polymer of high molecular weight was achieved in Examples C-5 to C-8.
[4]The amount of time the polymerization reaction was heated under vacuum at 350° C..
[5]Melt viscosity measured at 340° C. unless marked otherwise.
[6]Melt viscosity measured at 345° C..
[7]Melt viscosity measured at 350° C..
[8]ND means not determined.

TABLE 2

PROPERTIES OF POLYMERS CONTAINING 30% GLASS BY WEIGHT

| Example | Tensile Strength kpsi | Tensile Elongation % | Tensile Modulus Mpsi | Flex Strength kpsi | Flex Modulus Mpsi | Notched Izod ft – lb/in | HDT at 264 psi (°C.) |
|---|---|---|---|---|---|---|---|
| 1 | 26.8 | 1.6 | 2.8 | 31.5 | 2.1 | 1.9 | 226 |
| 2 | 25.5 | 1.9 | 2.7 | 31.9 | 2.2 | 2.4 | 269 |
| 3 | 28.9 | 1.6 | 3.1 | 32.7 | 2.3 | 2.1 | 228 |
| 4 | ND | ND | ND | 33.8 | 2.3 | 4.4 | 275 |
| 5 | ND | ND | ND | 33.8 | 2.2 | 2.8 | 272 |
| C-3 | 23.0 | 2.0 | 2.3 | 31.4 | 2.0 | 4.4 | 294 |
| C-4 | 22.5 | 2.0 | 2.3 | 32.0 | 2.2 | 3.1 | 284 |
| C-5 | 28.9 | 2.3 | 2.6 | 35.5 | 2.1 | 4.4 | 291 |
| C-6 | 28.2 | 2.2 | 2.6 | 33.8 | 2.1 | 7.3 | 304 |
| C-7 | 28.0 | 2.6 | 2.5 | 34.4 | 2.2 | 4.4 | 302 |
| C-8 | 21.9 | 2.1 | 2.2 | 29.9 | 2.0 | 2.0 | 289 |

TABLE 3

FIBER PROPERTIES OF POLYMERS WITH IA

| Example | Spinning Temp. (C.°) | Heat Treatment Profile | Heat Treated Fiber Properties | | |
|---|---|---|---|---|---|
| | | | Tenacity (g/d) | Elongation (%) | Modulus (g/d) |
| 1 | 309 | 1 | 8.3 | 2.8 | 340 |
| 2 | 339 | 2 | 19.0 | 4.0 | 470 |
| 3 | 319 | 1 | 14.8 | 3.3 | 450 |
| 4 | 329 | 2 | 23.0 | 4.9 | 390 |
| 5 | 329 | 2 | 25.0 | 5.4 | 390 |

Heat treatment profile 1 = 2 h at 230° C. and 16 h at 270° C.
Heat treatment profile 2 = 8 h at 300° C.

We claim:

1. A thermotropic liquid crystalline poly(esteramide) consisting essentially of monomer repeat units I', II', III', IV', V', VI', and optional VII', where I' is 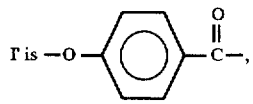

II' is 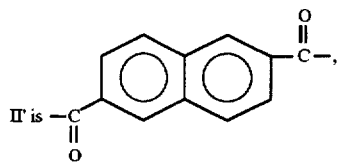

III' is 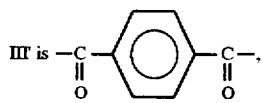

IV' is 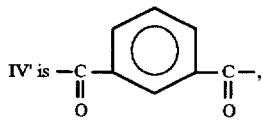

V' is 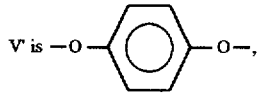

VI' is 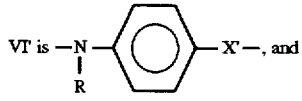, and

VII' is 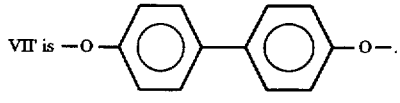.

wherein X' is selected from the group consisting of NR', C=O, O, and mixtures thereof;

wherein R and R' are alike or different and are independently selected from the group consisting of H, alkyl groups having 1 to 4 carbon atoms, fluoroalkyl groups having 1 to 4 carbon atoms, phenyl, and mixtures thereof;

wherein said liquid crystalline poly(esteramide) on a mole basis consists essentially of about 20% to about 70% of monomer repeat unit I', about 5% to about 35% of monomer repeat unit II', about 2% to about 20% of monomer repeat unit III', about 0.5% to about 10% of monomer-repeat unit IV', about 5% to about 35% of monomer repeat unit V', about 2% /to about 25% of monomer repeat unit VI', and 0 to about 15% of monomer repeat unit VII'.

2. The thermotropic liquid crystalline poly(esteramide) recited in claim 1, wherein said monomer repeat unit VI' is

3. The thermotropic liquid crystalline poly(esteramide) recited in claim 2, consisting essentially of monomer repeat units I', II', III', IV', V' and VI'.

4. The thermotropic liquid crystalline poly(esteramide) recited in claim 1, on a mole basis consisting essentially of about 20% to about 65% of monomer repeat unit I', about 10% to about 30% of monomer repeat unit II', about 2% to about 15% of monomer repeat unit III', about 1 % to about 5% of monomer repeat unit IV', about 10% to about 30% of monomer repeat unit V', about 3% to about 20% of monomer repeat unit VI', and 0 to about 10% of monomer repeat unit VII'.

5. The thermotropic liquid crystalline poly(esteramide) recited in claim 4, wherein said monomer unit VI' is

6. The thermotropic liquid crystalline poly(esteramide) recited in claim 5, on a mole basis consisting essentially of about 40% to about 65% of monomer repeat unit I', about 10% to about 20% of monomer repeat unit II', about 2% to about 15% of monomer repeat unit III', about 1 % to about 5% of monomer repeat unit IV', about 10% to about 20% of monomer repeat unit V', and about 3% to about 15% of monomer repeat unit VI'.

7. The thermotropic liquid crystalline polymer recited in claim 5, on a mole basis consisting essentially of about 60% of monomer repeat unit I', about 12.5% of monomer repeat unit II', about 5% of monomer repeat unit III', about 2.5 % of monomer repeat unit IV', about 15% of monomer repeat unit V', and about 5% of monomer repeat unit VI'.

8. A thermotropic liquid crystalline poly(esteramide) composition comprising the thermotropic liquid crystalline poly(esteramide) of claim 1 and up to about 70% by weight of one or more additives selected from the group consisting of reinforcing fillers, reinforcing fibers, oxidation stabilizers, heat stabilizers, light stabilizers, lubricants, mold release agents, dyes, pigments and plasticizers.

9. A thermotropic liquid crystalline poly(esteramide) composition comprising the thermotropic liquid crystalline poly(esteramide) of claim 1 and up to about 70% by weight of one or more additives selected from the group consisting of glass fiber, calcium silicate, silica, clays, talc, mica, polytetrafluoroethylene, graphite, alumina, sodium aluminum carbonate, barium ferrite, wollastonite, carbon fiber, polymeric fiber, aluminum silicate fiber, titanium fiber, rock wool fiber, steel fiber, tungsten fiber, and wollastonite fiber.

10. A shaped article comprising the polymer of claim 1.

11. A fiber comprising the polymer of claim 1.

12. An extruded sheet or film comprising the polymer of claim 1.

13. A method of making a thermotropic liquid crystalline poly(esteramide), comprising the step of combining monomers I, II, III, IV, V, VI, and optional VII or reactive derivatives of said monomers under conditions whereby said monomers condense to yield a polymer having an inherent viscosity of at least about 2 dl/g, as measured at 25° C. as a 0.1 % solution on a weight/volume basis in a mixture of equal volumes of pentafluorophenol and hexafluoroisopropanol, where

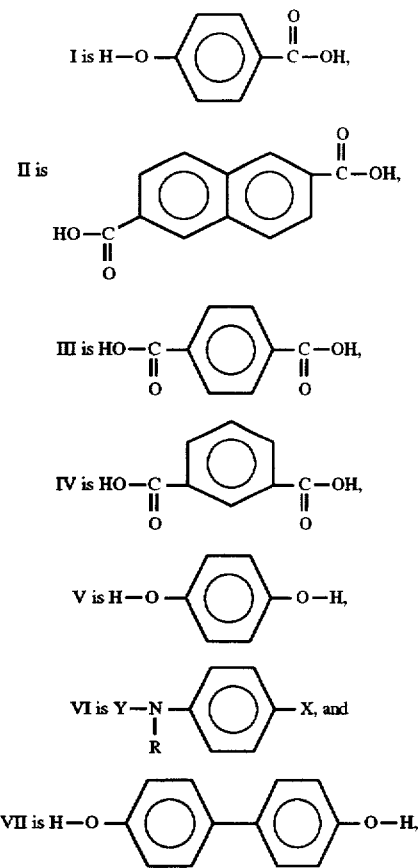

wherein X is selected from the group consisting of NY'R'.C(=O)OH, OH and mixtures thereof;

wherein Y and Y' are independently selected from the group consisting of H,C(=O)CH$_3$, and mixtures thereof;

wherein R and R' are alike or different and are independently selected from the group consisting of H, alkyl groups having 1 to 4 carbon atoms, fluoroalkyl groups having 1 to 4 carbon atoms, phenyl, and mixtures thereof;

wherein the concentrations of said monomers on a mole basis are about 20% to about 70% of I, about 5% to about 35% of II, about 2% to about 20% of III, about 0.5% to about 10% of IV, about 5% to about 35% of V, about 2% to about 25 % of monomer VI, and 0 to about 15 % of monomer VII.

14. The method recited in claim 13, wherein said monomers are condensed by melt acidolysis polymerization.

15. The method recited in claim 13, wherein said monomers are condensed to yield a polymer having an inherent viscosity of at least about 3 dl/g.

16. In a method of synthesizing a liquid crystalline polymer by melt condensation of monomers consisting essentially of 4-hydroxybenzoic acid, hydroquinone, one or more aromatic diacids selected from the group consisting of 2,6-naphthalenedicarboxylic acid, terephthalic acid, 4,4'-biphenyldicarboxylic acid, and mixtures thereof, and an optional other aromatic diol selected from the group consisting of 2,6-dihydroxynaphthalene, 4,4'-biphenol, and mixtures thereof, in the presence of acetic anhydride at a temperature high enough to esterify said monomers to a polymer having an inherent viscosity of at least about 3 dl/g as measured at 25° C. as a 0. 1 % solution (weight/volume) in a mixture of equal volumes of pentafluorophenol and hexafluoroisopropanol, the improvement of including isophthalic acid as a comonomer in an amount of about 0.5 mole % to about 10 mole %.

17. The improvement recited in claim 16, wherein said aromatic diacids comprise 2,6-naphthalenedicarboxylic acid.

18. The improvement recited in claim 17, wherein said aromatic diacids also comprise terephthalic acid.

19. The improvement recited in claim 18, wherein said monomers also comprise 4,4'-biphenol.

20. The improvement recited in claim 16, wherein said isophthalic acid is included in an amount of about 1 mole % to about 5 mole %.

21. The improvement recited in claim 16, wherein said monomers also comprise one or more amine monomers selected from the group consisting of 4-aminophenol, 4-aminobenzoic acid, 1,4-phenylenediamine, N-methyl derivatives of 4-aminophenol, 4-aminobenzoic acid, and 1,4-phenyldiamine, and N-acetyl derivatives of said amine monomers.

22. The improvement recited in claim 21, wherein said amine monomer is 4-aminophenol or N-acetyl-4-aminophenol.

23. The improvement recited in claim 22, wherein said aromatic diacids comprise 2,6-naphthalenedicarboxylic acid.

24. The improvement recited in claim 23, wherein said aromatic diacids also comprise terephthalic acid.

25. The improvement recited in claim 24, wherein said monomers also comprise 4,4'-biphenol.

26. The improvement recited in claim 21, wherein said isophthalic acid is included in an amount of about 1 mole % to about 5 mole %.

27. The product made by the process of claim 16.

28. The product made by the process of claim 21.

* * * * *